United States Patent
Moore, Jr. et al.

(10) Patent No.: US 6,680,011 B2
(45) Date of Patent: Jan. 20, 2004

(54) METHOD FOR CIRCULATING PRESSURIZED FLUIDS TO IMPROVE GAS CHANNEL COOLING

(75) Inventors: Roy E. Moore, Jr., Killingworth, CT (US); Daniel J. Swistak, Newmarket, NH (US)

(73) Assignee: Infiltrator Systems, Inc., Old Saybrook, CT (US)

( * ) Notice: Subject to any disclaimer, the term of this patent is extended or adjusted under 35 U.S.C. 154(b) by 0 days.

(21) Appl. No.: 09/683,177

(22) Filed: Nov. 29, 2001

(65) Prior Publication Data

US 2002/0083721 A1 Jul. 4, 2002

Related U.S. Application Data

(60) Provisional application No. 60/250,914, filed on Dec. 1, 2000.

(51) Int. Cl.[7] .......................... B29D 23/00; B29C 49/66
(52) U.S. Cl. .................. 264/37.16; 264/572; 264/37.17
(58) Field of Search .............................. 264/572, 37.16, 264/37.17

(56) References Cited

U.S. PATENT DOCUMENTS

| | | | |
|---|---|---|---|
| 5,096,655 A | * 3/1992 | Baxi et al. ................ | 264/572 |
| 5,127,814 A | 7/1992 | Johnson et al. | |
| 5,204,050 A | * 4/1993 | Loren ....................... | 264/504 |
| 6,403,014 B1 | * 6/2002 | Hendry et al. ............. | 264/500 |

FOREIGN PATENT DOCUMENTS

| | | |
|---|---|---|
| DE | 4444579 A1 | 6/1996 |
| EP | 0400308 A2 | 12/1990 |
| EP | 0745468 A1 | 12/1996 |
| EP | 1070576 A2 | 1/2001 |
| JP | 04267124 | 9/1992 |
| JP | 06091686 | 5/1994 |
| JP | 09309126 | 2/1997 |

OTHER PUBLICATIONS

"Gas Cool", Society of Plastics Industry, Structural Plastics Division, Annual Conference, Dearborne, MI, Apr., 2002, 5 pages.

International Search Report, International Application No. PCT/US 01/44593, International Filing Date Nov. 5, 2001, 8 pages.

* cited by examiner

*Primary Examiner*—Suzanne E. McDowell
(74) *Attorney, Agent, or Firm*—Cantor Colburn LLP

(57) ABSTRACT

A method for manufacturing a molded article comprises injecting a quantity of molding material sufficient for the preparation of the molded article into a cavity of a mold, injecting a first portion of fluid into the mold cavity, creating a gas channel within the molding material, and forming the molded article within the mold cavity. At least a portion of the first portion of fluid is exhausted through a gas port, a second portion of fluid is injected into the mold material, and the molded article is cooled within the mold cavity to a temperature beneath a softening point of the molding material.

29 Claims, 2 Drawing Sheets

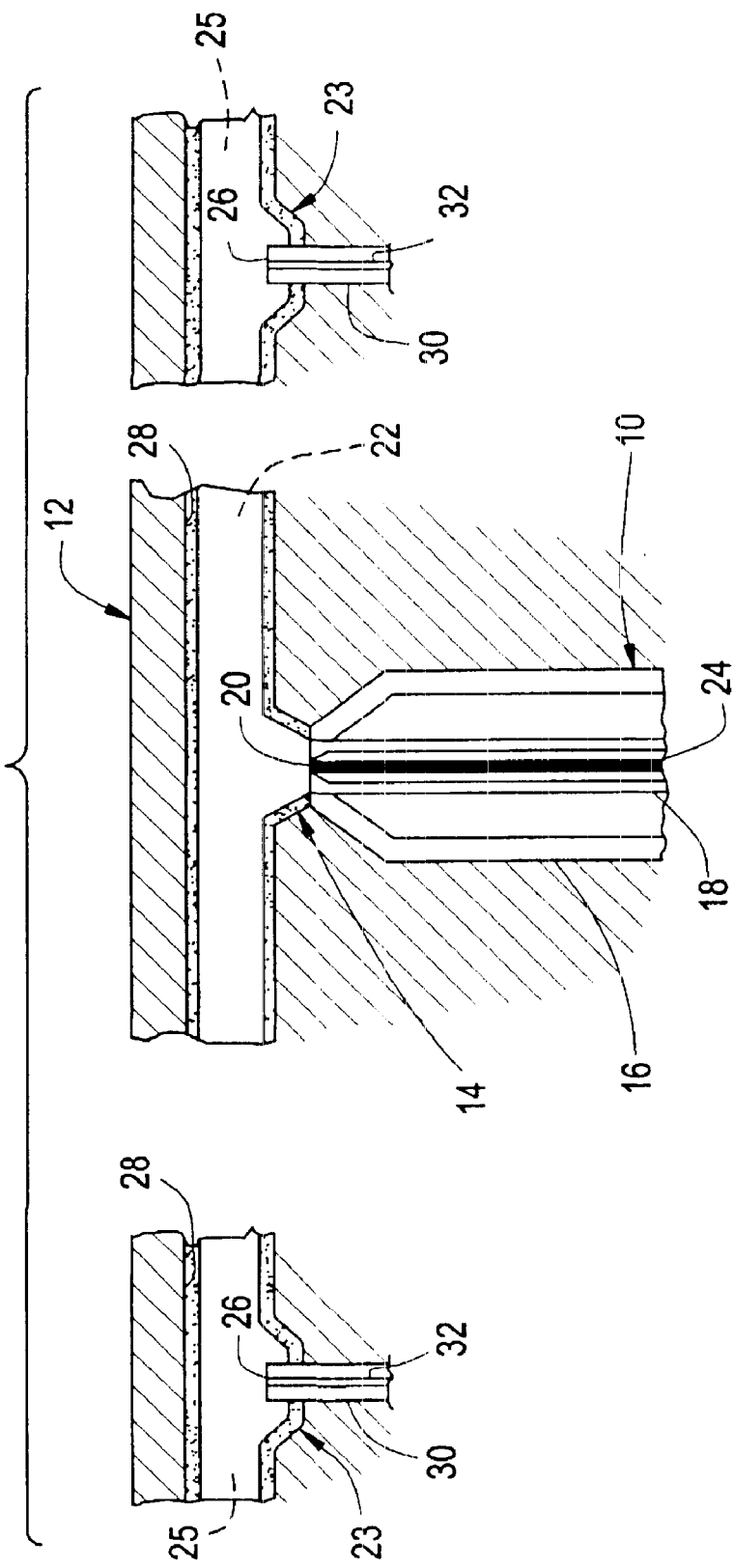

METHOD FOR CIRCULATING PRESSURIZED FLUIDS TO IMPROVE GAS CHANNEL COOLING

CROSS REFERENCE TO RELATED APPLICATIONS

This application claims the benefit of the filing date of U.S. Provisional Application Serial No. 60/250,914 filed Dec. 1, 2000, which is hereby incorporated by reference in its entirety.

BACKGROUND OF INVENTION

In gas assisted injection molding, articles are produced by injecting molten plastic into the mold cavity and charging a body of pressurized gas or liquid therein to form a hollow portion in selected locations within the thermoplastic material. Pressure is maintained on the gas in the hollow space within the molded object until the plastic material in the mold cavity has set. Thereafter, the pressurized gas or liquid is released from the molded part's hollow area, and the molded part is removed from the mold cavity.

Process limitations still exist in conventional gas assisted injection molding processes, which give less than the desired product properties and dimensions. One problem is a tendency of gas ribs located in the mold cavity to have areas that are not desirably hollowed out, since gas sometimes pushes molten plastic from opposing directions whereupon it is trapped and forms a block or slug of molding material. Such a region will not cool as fast as the rest of the adjacent hollow structure, which undercuts the product's cycle time, and produces localized distortions and surface shrinkage. Another problem results when upon removal of the molded part, residual pressurized gas, trapped in the molded part, releases and causes wall eruptions at locations that are insufficiently cooled or have very thin walls. Still yet another problem is the interior of the gas channel remains hot long after the exterior surface cools. When exhausting gas back through the hot, viscous interior, the gas port or other point of exhaustion typically becomes obstructed.

Consequently, there exists a need to enhance cooling of molding material to prevent defects in molded articles, and reduce cycle times for manufacturing molded articles.

TECHNICAL FIELD

The present disclosure relates to gas assisted injection molding and, more particularly, to circulating fluid in gas channels within a molding material in a mold.

SUMMARY OF INVENTION

Disclosed is an apparatus and a method for manufacturing a molded article. The method comprises injecting a quantity of molding material sufficient for the preparation of the molded article into a cavity of a mold, injecting a first portion of fluid into the mold cavity, creating a gas channel within the molding material, and forming the molded article within the mold cavity. At least a portion of the first portion of fluid is exhausted through a gas port, a second portion of fluid is injected into the mold material, and the molded article is cooled within the mold cavity to a temperature beneath a softening point of the molding material.

The foregoing and other features and advantages will become more apparent from the following description of the best mode and accompanying drawings.

BRIEF DESCRIPTION OF DRAWINGS

For a further understanding of the nature of the injection molding system and method of using the same, as well as other features and advantages thereof, reference should be made to the following detailed description taken in conjunction with the accompanying drawings, which are meant to be exemplary, not limiting, and wherein like elements are numbered alike in the several figures.

FIG. 2 is a partial cross-sectional view of the injection nozzle assembly of FIG. 1 and an embodiment of a pair of gas ports mounted on either side of the assembly within the mold cavity.

DETAILED DESCRIPTION

Figure 1:
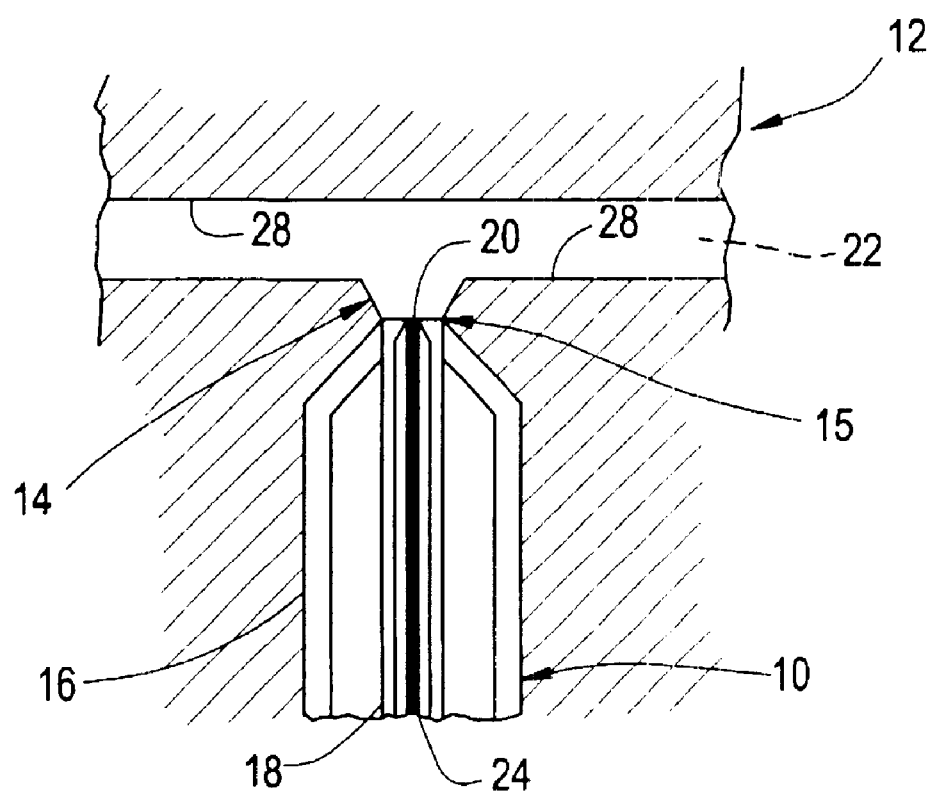
FIG. 1 is a cross-sectional view of an embodiment of an injection nozzle assembly fitted within a mold of an injection molding system.

An injection molding system for circulating fluids under pressure to improve gas channel cooling can comprise one or more injection nozzle assemblies that can inject fluids and/or molding material under pressure into a mold cavity. The injection nozzle assemblies comprise a nozzle assembly equipped with an injection aperture, nozzle rod and gas pin to simultaneously introduce both the molding material and fluids into the mold cavity, or to intermittently introduce each into the mold cavity. At the same time, fluids can optionally be exhausted from the mold cavity using one or more gas port(s), located in one or more gas ribs, channels, or pockets. The simultaneous injection and exhaustion of fluids can generate a back pressure within the mold cavity to hold the molded article in place. Meanwhile, the exhausted fluids can be cooled and re-circulated through the gas ribs to cool the interior surface of the gas channel. In the alternative, the fluids can be exhausted through one or more gas ports, while maintaining a minimum gas channel pressure. Yet another alternative is that the fluids can be introduced simultaneously into the mold cavity through both the injection nozzle and one or more gas ports. The simultaneous injection of fluids can create a differential pressure between the injection nozzle and one or more gas ports. The pressure can be decreased and/or increased to a desired value by exhausting fluids through the gas ports. Essentially, when employing either method, the circulation and/or re-circulation of fluid through the gas channels cools the molding material and reduces the cycle time for manufacturing the molded article.

"Molding material" is understood to mean any plastic material composition that exhibits plastic flow properties under injection molding temperature and pressure conditions. "Molding material" includes all organic and inorganic materials having, with or without additives, thermoplastic characteristics, including certain synthetic organic resins, such as polyethylene and polyvinyl chloride, and the like, which also possess thermoplastic characteristics. Likewise, other resins, such as phenolic resins, and the like, which are widely accepted as thermosetting resins, can also be employed. More specifically, the "molding material" can comprise thermoplastic and thermoset materials, or combinations comprising at least one of the foregoing materials, with polyolefin materials, polypropylenes, polyethylene, and, more particularly, high density polyethylenes and low density polyethylenes preferred, and high density polyethylenes especially preferred. Some possible high density polyethylenes are "ALATHON" and "PETROTHENE", commercially available from Equistar Chemicals, Houston, Tex.; "SCLAIR" and "NOVAPOL", commercially available from Nova Chemicals, Pittsburgh, Pa.; "MARTEX" and "PCR", commercially available from Phillips Chemical, Bartlesville, Okla.; and "FORTIFLEX", commercially available from Solvay Polyers, Houston, Tex.; and the like.

As employed herein, the term "fluid" is understood to mean gaseous and liquid pressurizing fluids having a viscosity up to about several centipoises. Examples of such fluids are gases such as argon, nitrogen, carbon dioxide, air, methyl chloride, propylene, butylenes, gaseous fluorocarbons, and other gases inert with respect to the molding material; and liquids such as pentane, water, liquid fluorocarbons, and other liquids inert with respect to the molding material; as well as combinations comprising at least one of the foregoing fluids, and the like. It is to be understood that such "fluid" should be either not reactive with the molding material under the pressure and temperature conditions employed in the process, or, if reactive, the reaction does not occur with such speed as to completely prevent fluidity. Preferably, the viscosity ratio of the molding material to the fluid is greater than or equal to about 10:1.

Referring now to FIG. 1, the injection molding system can include one or more injection nozzle assemblies 10 for injecting molding material into a mold assembly 12. Injection nozzle assembly 10, which is disposed in physical contact with the mold assembly 12, is in fluid communication with a sprue 14. The sprue 14 comprises a nozzle inlet 15 such that the nozzle inlet 15 is in fluid communication with a mold cavity 22. The injection nozzle assembly 10 comprises a nozzle body 16 with a nozzle rod 18 disposed at a front portion thereof such that an injection aperture 20 of the nozzle body 16 engages the nozzle inlet 15. The nozzle rod 18, containing a gas pin 24 concentrically disposed therein, is concentrically disposed within the nozzle body 16. The nozzle rod 18 and the gas pin 24 are in fluid communication with a molding material receptacle (not shown) and a fluid reservoir (not shown), respectively, as well as in fluid communication with the mold cavity 22 through the injection aperture 20 and nozzle inlet 15.

The nozzle rod 18 provides a quantity of molding material into the mold cavity 22 sufficient for the preparation of the molded article. Gas pin 24 provides a quantity of fluid under pressure sufficient to force the molding material through the nozzle aperture 20 and into the mold cavity 22. Nozzle aperture 20 as well as the nozzle inlet 15 can be defined by any geometry capable of mating, e.g., preferably sealingly engaging to avoid molding material leakage. Possible geometries can include oval, oblong, circular, or multi-sided (e.g., hexagonal, septagonal, and the like), and the like.

Referring also to FIG. 2, at least one injection nozzle assembly 10 can preferably be fitted to the sprue 14 of the mold to balance the filling of the mold cavity 22 with molding material. The injection nozzle assembly 10 engages the mold cavity 22 at a predetermined distance dependent upon the particular application and the thickness of the molded article in the particular location of the injection nozzle assembly 10. Likewise, one or more gas ports 26 can preferably be fitted about the periphery of the mold cavity 22. The gas ports 26 vent and exhaust fluid, and comprise a gas pin sleeve 30 and a porous pin 32 for exhausting fluids pressure from the mold cavity 22. In addition, the gas ports 26 can optionally be fitted within one or more gas channels, pockets, or ribs 23, disposed within an interior surface 28 of the mold cavity 22 to exhaust and vent fluid from the mold cavity 22 using the gas pin sleeve 30 and porous pin 32 combination.

The porous pin 32 can preferably be constructed out of a porous material such as a stainless steel, aluminum, ceramic, or other rigid porous material, and combinations comprising at least one of the foregoing materials. The pore size of the pin 32 can preferably be smaller than the particle size of the molding material, with diameter preferably larger than the diameter of the gas pin 24 to facilitate flow of the fluid out of the mold, through the pin 32. A typical porous pin configuration can have a diameter of less than or equal to about 2.00 inches (about 50.8 millimeters (mm)), with a diameter of less than about 0.5 inches (about 12.7 mm) preferred. Also preferred is a diameter of greater than or equal to about 0.125 inches (about 3.175 mm), with greater than or equal to about 0.25 inches (about 6.35 mm) more preferred. The pore size is preferably about 7 microns to about 15 microns preferred.

In the alternative, or in addition to, employing a porous pin, a self-venting pin or a pin having a plurality of vent slots, as known to one of ordinary skill in the art, may be employed. The vents in such self-venting pins, and pins having vent slots, generally have a depth of from about 0.001 inches to about 0.030 inches, preferably from about 0.002 inches to about 0.020 inches, most preferably from about 0.005 inches to about 0.010 inches.

The porous pin 32 can be fixedly secured within the gas pin sleeve 30 and remain stationary in the mold cavity 22 and/or can be movably secured such that it can extend and retract within the gas pin sleeve 30 using a mechanical, hydraulic, and/or an electrical device. When movably secured, the porous pin 32 can extend into the mold cavity 22 and inject, or exhaust and vent fluid.

A method for manufacturing a molded article comprises injecting a quantity of molding material sufficient for the preparation of the molded article, from the nozzle rod 18 through the nozzle aperture 20, the nozzle inlet 15, and into the mold cavity 22. The nozzle rod 18 can be extended into the sprue 14, and/or at least partially extended into the mold cavity 22. Once the molding material is disposed into the mold cavity 22, the nozzle rod 18 can be retracted, and the gas pin 24 extended into the mold cavity 22 through the nozzle aperture 20, and nozzle inlet 15. The gas pin 24 can also be extended into the sprue 14, and/or at least partially extended into the mold cavity 22. Likewise, both the nozzle rod 18 and gas pin 24 can extend into the sprue 14 and/or at least partially extend into the mold cavity 22, through the nozzle aperture 20 to simultaneously inject both the molding material and fluid under pressure.

A quantity of fluid can be injected simultaneously, or at intervals opposite the injected molding material, under pressure, through the gas pin 24 to expand and distribute the molding material over the interior surface 28 of the mold cavity 22. The fluid forms one or more gas channels 25 within the molding material, causing the molding material to flow into and cover (preferably uniformly) the interior surface 28 of both the mold cavity 22 and optional gas ribs 23. As the molding material conforms to the interior surface 28 of both the gas ribs 23 and the mold cavity 22, the forming molded article can be held in place by a constant or varied pressure of the fluid.

Alternatively (or additionally), fluid can be injected, under pressure, into the mold cavity 22 through the gas ports 26. Once the molding material bypasses the gas port 26, additional fluid, preferably at a different pressure than that of the fluid within the channels 25 (e.g., higher or lower, with a lower pressure preferred), is employed to enable fluid communication between the gas channels and the gas port. For example, the fluid pressure within the channels could be about 800 to about 1,000 pounds per square inch (psi), while the pressure of the additional fluid could be about 500 to about 800 psi. The pressure differential between the fluids causes the molding material covering the gas port to form a fissure or opening, fluidly connecting the vent port 26 and channel 25. Once fluid communication is established, the gas port 26 can be used to introduce additional fluid into the mold cavity 22 or can be employed as a vent to remove all or a portion of the first fluid, which is now typically hot (e.g., has increased in temperature due to the temperature of the molding material), from the channel 25. Removal of the first fluid at the gas port 26, while introducing additional fluid through the nozzle 10 and/or through other gas port(s), enables cooling of the mold material (e.g., by introducing fluid having a temperature lower than the fluid exiting at the gas port cools the molding material), and enables control of the internal pressure of the mold cavity.

Basically, as a new quantity of fluid is being circulated through mold cavity 22 by simultaneous or intermittent injection and exhaustion of fluid, a desired (e.g., constant or varied) pressure can be maintained to retain the molded article in place, avoiding collapse of the molded article walls within the mold cavity 22. Meanwhile, the exhausted fluid can be cooled to a temperature beneath the softening point of the molding material and re-circulated through the mold cavity 22 and optional gas ribs 23. Re-circulating the cooled exhausted fluid through the gas ribs 23 and mold cavity 22 cools the gas channels 25 formed within the molded article to a temperature beneath the softening point of the molding material, and thus cools the molded article as well. Alternatively, and if desired, prior to cooling the exhausted fluid, the temperature of the exhausted fluid can be raised above the softening point of the molding material so that the exhaust fluid is recirculated at a temperature above its initial temperature. At that point, a new quantity of fluid can be injected to reform the molded article within the mold cavity. Once the molded article has cooled, the injection nozzle assembly 10 can be closed and the interior of the molded article can be opened to the atmosphere through the gas pin 24 to equalize the pressure within the molded article. The mold assembly can then be opened to remove the molded article.

The method for circulating fluids to improve gas channel cooling provides several advantages over existing injection molding systems used today. One advantage is maintaining a constant or differential pressure when simultaneously, or intermittently injecting and exhausting fluid lowers the cycle time for manufacturing the molded article. The pressure within the mold cavity can be lowered or increased by simultaneously or intermittently adjusting the pressures at the injection nozzles and/or gas ports. As the fluid circulates, the interior surface of the gas rib cools while the molded article remains in place within the mold cavity. The resulting molded article's cycle time is shortened due to the reduced amount of time necessary to cool the interior of the gas channels formed within the molded article.

Yet another advantage is implementing gas ports within the optional gas rib structures provides another entry point for injecting fluid under pressure into the mold cavity and forming gas channels within the molded article. The gas ports and injection nozzles can work concurrently to circulate the fluid through the mold cavity to cool the gas rib and the molded article. In addition, the pressure can be increased, or decreased between the entry points, so that a differential pressure forms and causes the fluid to re-circulate through the mold cavity using the gas channels.

Consequently, the resulting molded article's cycle time is shortened due to the enhanced gas channel cooling of the gas rib and molded article.

Finally, clogging of gas pin is avoided. In systems where fluid is introduced and removed via the same pins, pin clogging is common. Essentially, the fluid enters the cavity, is held within the cavity to form the article, and is thereby heated by the molten molding material. The hot fluid, when subsequently removed from the mold cavity, often draws molten molding material into the pin where it cools and clogs the pin. In contrast, the present system cools the molding material, venting the fluid through gas port(s), thereby preventing pin clogging.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for manufacturing a molded article, comprising:
    injecting a quantity of molding material sufficient for the preparation of the molded article into a cavity of a mold;
    injecting a first portion of fluid into the mold material;
    creating a fluid channel within the molding material;
    forming the molded article within the mold cavity;
    exhausting at least a portion of the first portion of fluid through a fluid port;
    cooling the exhausted portion of fluid and re-injecting the cooled fluid into the first fluid channel; and
    cooling the molded article within the mold cavity to a temperature beneath a softening point of the molding material.

2. The method recited in claim 1, wherein the cooled fluid has a temperature beneath the softening point of the molding material.

3. The method recited in claim 1, further comprising injecting the molding material and the first portion of fluid simultaneously.

4. The method recited in claim 1, further comprising injecting a second portion of fluid to the mold cavity through the fluid port, wherein the second portion of fluid has a lower pressure than the first portion of fluid.

5. The method recited in claim 1, further comprising exhausting at least a portion of the first portion of fluid through a porous pin extending into the fluid port, and re-injecting the exhausted fluid into the mold cavity through a gas rib, the fluid port, or an injection nozzle assembly.

6. The method recited in claim 5, wherein the porous pin movably extends into the mold cavity, wherein the mobility is imparted by a device selected from the group consisting of a mechanical, electrical, and hydraulic.

7. The method recited in claim 5, wherein said porous pin is a self-venting pin.

8. The method recited in claim 5, wherein said porous pin is a pin having vent slots.

9. The method recited in claim 5, further comprising
    injecting a third portion of fluid into the mold material at a distance from an injection point of the first portion of fluid; and
    ceasing the injection of the third portion of fluid once fluid communication is established between the first portion of fluid and the third portion of fluid and a second fluid channel has been formed.

10. The method recited in claim 4, further comprising ceasing the injection of the third portion of fluid of fluid once fluid communication is established between the first portion of fluid and the third portion of fluid.

11. The method recited in claim 1, wherein the first fluid port is disposed within a gas rib within the mold cavity.

12. A method for manufacturing a molded article, comprising:
    injecting a quantity of molding material sufficient for the preparation of the molded article into a cavity of a mold;

injecting a first portion of fluid into the mold material;

creating a first fluid channel within the molding material;

forming the molded article within the mold cavity;

exhausting at least a portion of the first portion of fluid through a fluid port having a porous pin;

injecting a second portion of fluid into the mold material;

cooling the molded article within the mold cavity to a temperature beneath a softening point of the molding material; and re-injecting the exhausted fluid into the mold cavity through a gas rib, the fluid port, or an injection nozzle assembly.

13. The method recited in claim 12, wherein the porous pin movably extends into the mold cavity, wherein the mobility is imparted by a device selected from the group consisting of a mechanical, electrical, and hydraulic.

14. The method recited in claim 12, wherein the porous pin is a self-venting pin.

15. The method recited in claim 12, wherein the porous pin is a pin having vent slots.

16. The method recited in claim 12, further comprising injecting a third portion of fluid into the mold material, wherein the third portion of fluid has a different pressure than the first portion of fluid;

ceasing the injection of the third portion of fluid once fluid communication is established between the first portion of fluid and the third portion of fluid; and retracting the porous pin to form a second fluid channel.

17. A method for manufacturing a molded article, comprising:

injecting a quantity of molding material sufficient for the preparation of the molded article into a cavity of a mold;

injecting a first portion of fluid into the mold material;

creating a first fluid channel within the molding material;

forming the molded article within the mold cavity;

exhausting at least a portion of the first portion of fluid through a first fluid port;

injecting a second portion of fluid into the mold material through a second fluid port;

cooling the molded article within the mold cavity to a temperature beneath a softening point of the molding material;

injecting a third portion of fluid to the mold cavity through the second fluid port or a third fluid port;

wherein the third portion of fluid has a lower pressure than the first portion of fluid; and ceasing the injection of the third portion of fluid once fluid communication is established between the first portion of fluid and the third portion of fluid.

18. The method recited in claim 17, wherein the first fluid port is disposed within a gas rib within the mold cavity.

19. The method recited in claim 17, further comprising injecting a third portion of fluid into the mold cavity through a porous pin extending into the first fluid channel;

ceasing the injection of the third portion of fluid once fluid communication is established between the first portion of fluid and the third portion of fluid; and retracting the porous pin to form a second fluid channel.

20. The method recited in claim 19, wherein the porous pin is a self-venting pin.

21. The method recited in claim 19, wherein said porous pin is a pin having vent slots.

22. The method recited in claim 19, wherein the second fluid port further comprises a porous pin movably extended into the mold cavity, and wherein the mobility is imparted by a device selected from the group consisting of a mechanical, electrical, and hydraulic, and comprising continuing to inject the first portion of fluid while injecting and ceasing the injection of the third portion of fluid.

23. A method for manufacturing a molded article, comprising:

injecting a quantity of mold material sufficient for the preparation of the molded article into a cavity of a mold;

injecting a first portion of fluid into the mold material through a first fluid port comprising a porous pin;

creating a first fluid channel within the mold material;

forming the molded article within the mold cavity;

exhausting at least a portion of the first portion of fluid;

injecting a second portion of fluid through a second fluid port into the mold material, wherein the second fluid port is spaced apart from the first fluid port; and cooling the molded article within the mold cavity to a temperature beneath a softening point of the mold material.

24. The method of claim 23, wherein the second portion of fluid has a different pressure than the first portion of fluid.

25. The method of claim 23, further comprising exhausting the first portion of fluid through the second fluid port.

26. The method of claim 25, further comprising re-injecting the exhausted fluid into the mold cavity.

27. The method of claim 26, further comprising cooling the exhausted fluid prior to re-injecting it.

28. A method for manufacturing a molded article, comprising:

injecting a quantity of mold material sufficient for the preparation of the molded article into a cavity of a mold;

injecting a first portion of fluid through a first fluid port into the mold material;

creating a first fluid channel within the mold material;

forming the molded article within the mold cavity;

injecting a second portion of fluid into the mold material through a second fluid port located a distance from the first fluid port; wherein the second portion of fluid has a different pressure than the first portion of fluid;

ceasing the injection of the second portion of fluid once fluid communication is established between the first portion of fluid and the second portion of fluid to form a combined fluid channel; and cooling the molded article to a temperature beneath a softening point of the mold material.

29. The method of claim 28, further comprising continuing to inject the first portion while injecting the second portion, wherein the second fluid port comprises a second porous pin extended into the mold material, and wherein the mobility is imparted by a device selected from the group consisting of a mechanical, electrical, and hydraulic; and retracting the second porous pin to allow at least one of the first portion and the second portion to vent from the combined fluid channel.

* * * * *